2 Sheets--Sheet 1.

H. W. CAMPBELL & J. H. JOHNSON.
Water-Wheels.

No. 166,682.  Patented Aug. 17, 1875.

Attest:
J. Mason Gadzler
Jas. H. Smoot

Inventors
Henry W. Campbell
Joseph H. Johnson
by N. Crawford atty.

2 Sheets--Sheet 2.

H. W. CAMPBELL & J. H. JOHNSON.
Water-Wheels.

No. 166,682. Patented Aug. 17, 1875.

Attest:
J. Mason Gotzler
Eph. P. Jordon

Inventor:
Henry W. Campbell
Joseph H. Johnson
by N. Crawford, atty.

UNITED STATES PATENT OFFICE.

HENRY W. CAMPBELL AND JOSEPH H. JOHNSON, OF PADUCAH, KENTUCKY.

IMPROVEMENT IN WATER-WHEELS.

Specification forming part of Letters Patent No. 166,682, dated August 17, 1875; application filed July 2, 1875.

*To all whom it may concern:*

Be it known that we, HENRY W. CAMPBELL and JOSEPH H. JOHNSON, of Paducah, in the county of McCracken and State of Kentucky, have made certain Improvements in Water-Wheels, of which the following is a specification:

The object of this invention is to improve that class of water-wheels known as turbines, and discharge the water from the wheel at its periphery; and it consists in the construction and arrangement of the parts with relation to each other, as will be fully hereinafter set forth.

Figure 1:
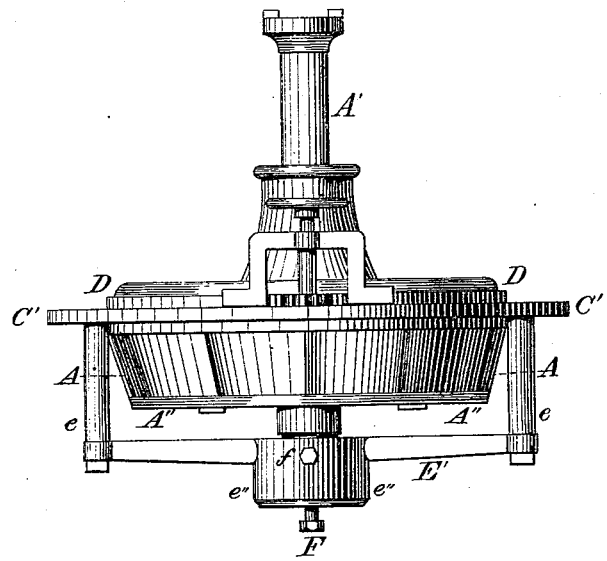
Figure 2:
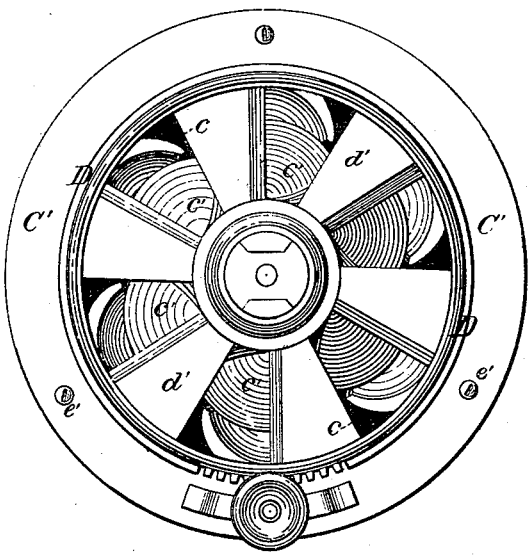
Figure 4:
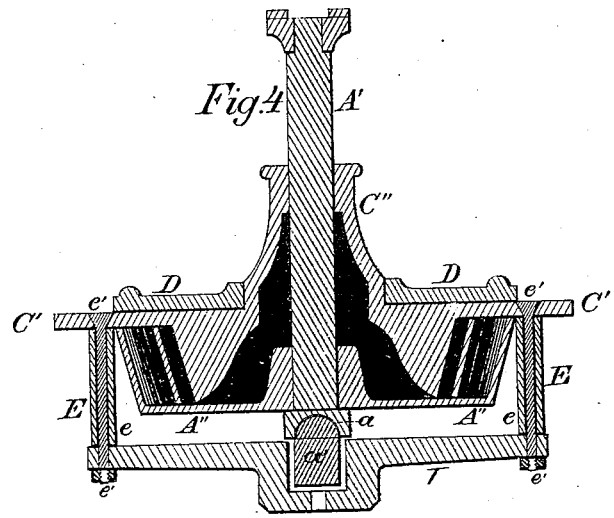
Figure 5:
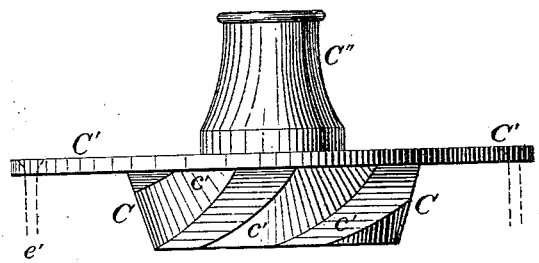
Figure 3:
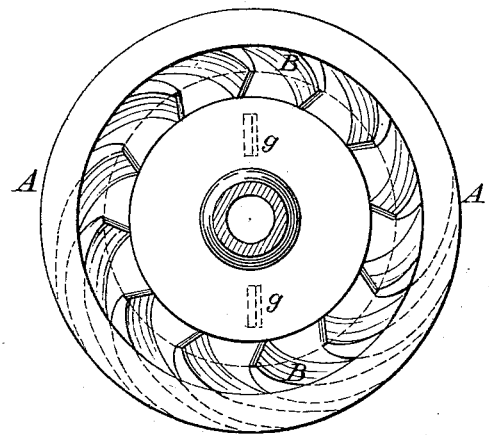

In the drawings, Figure 1 is a side view of the wheel and curb. Fig. 2 is a top or plan view of same. Fig. 3 is a top or plan view of the wheel detached from its curb or stationary support and gates. Fig. 4 is a section of Fig. 1, and Fig. 5 is a side view of the interior stationary core, and around which the wheel revolves.

A represents the annular wheel, fast upon shaft A' by the bottom plate A'', with the half-circle or conical socket $a$ in its lower end, to revolve and be centered upon the adjustable circular or conical bearing $a'$, as seen in Fig. 4. B are the circular buckets of the annular wheel, projecting inwardly from the rim of the wheel in eccentric direction from the center of revolution toward the center stationary core. The position of the buckets B with relation to each other shows a larger space between them at their inner ends than at their issues at the periphery of the wheel, as seen in Fig. 3, which construction allows of the proper impact of the water upon the circular inclined faces of the buckets, to insure the full power or weight of the water, less the friction, to act upon the wheel before it leaves the issues $b$ on the periphery of the wheel. C is the center core filling the annular space in the center of the wheel A, and is fast to or a part of face or flange plate C'. Plate or flange C' has inclined openings $c$ through it, extending into the core, and forming inclined spiral chutes $c'$ in the core, as seen in Fig. 5, and an upwardly-projecting bearing, C'', for the upright shaft A' to revolve and have a firm and steady bearing in. This construction of core and its chutes with the construction of the inner ends of the circular buckets with the bottom plate A'' of the wheel, to form a close fit around the core, prevents any loss in the action of the water upon buckets, as it conducts all the water passing through the wheel to impinge upon the face of the buckets, where it will produce the greatest effect upon the wheel. D is a horizontal gate revolving around the upwardly-projecting bearing C', and has inclined openings $d$ through it, to correspond and be coincident with the openings in plate or flange C', or can be revolved, so that the openings in said plate or flange C' will be perfectly closed by the part $d'$ of the gate between the openings in the revolving gate coming over the openings in the flange-plate C'. The gate D is revolved in the usual way by a toothed pinion gearing into teeth on the periphery of the gate, as seen in Figs. 1 and 2. E is the stationary frame in which the wheel is contained, and to which it is affixed, and is composed of the bridge-tree E', uprights $e\ e$, screw-bolts $e'$, and face or flange plate C'. Bridge-tree E' has a center enlargement, $e''$, that contains the convex or conical bearing $a'$, on which the shaft A' rests and revolves. The bearing $a'$ is adjustable vertically by the screw-bolt F, and transversely by the temper-screws $f\ f$, and by which the wheel is perfectly centered, and kept at the right height relatively with the frame to be close thereto, and run free with waste of water. $g\ g$ are inclined openings in the bottom plate A'' of wheel A, and are for the purpose of freely discharging the water that may be forced between the core and the inner ends of the buckets onto the bottom plate of the wheel, and as soon as the wheel is put into revolution this accumulation of water will be thrown out by the motion of the wheel alone, and the wheel will not be forced to carry the weight of dead water. H is the coupling on the upper end of shaft A', and by which motion is communicated to a shaft above the coupling.

By this construction of buckets, whereby a greater area or space is obtained between their inner ends than at the issues between them at the periphery of the wheel, gives an improved and increased action of the water upon the bucket, followed by a corresponding increase of power upon the wheel from the same amount of water.

Having thus described our invention, what we claim, and desire to secure by Letters Patent, is—

1. In a turbine water-wheel, the stationary center core C, projecting downward from plate C', and having the inclined spiral chutes $c'$, as and for the purposes described.

2. The combination, in a turbine water-wheel, of the stationary core C, having inclined spiral chutes $c'$, and the wheel A, having the buckets B, constructed to have a greater area between them at their inner ends than at the issues at the periphery of the wheel, as and for the purposes described.

3. The inclined discharge-openings $g$ $g$ through the bottom of wheel A, as and for the purposes described.

HENRY W. CAMPBELL.
JOSEPH H. JOHNSON.

Witnesses:
JAMES W. VEACH,
CHARLES S. JOHNSON.